(12) United States Patent
Yamasaki et al.

(10) Patent No.: US 9,525,281 B2
(45) Date of Patent: Dec. 20, 2016

(54) MULTILAYERED HEAT-RECOVERABLE ARTICLE, WIRE SPLICE, AND WIRE HARNESS

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Satoshi Yamasaki, Osaka (JP); Shinya Nishikawa, Osaka (JP); Ryouhei Fujita, Sennan-gun (JP); Yasutaka Emoto, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 14/652,523

(22) PCT Filed: Sep. 18, 2013

(86) PCT No.: PCT/JP2013/075163
§ 371 (c)(1),
(2) Date: Jun. 16, 2015

(87) PCT Pub. No.: WO2014/097694
PCT Pub. Date: Jun. 26, 2014

(65) Prior Publication Data
US 2015/0333494 A1     Nov. 19, 2015

(30) Foreign Application Priority Data
Dec. 20, 2012   (JP) .................. 2012-278701

(51) Int. Cl.
*H02G 15/26*   (2006.01)
*H02G 15/18*   (2006.01)
(Continued)

(52) U.S. Cl.
CPC ............. *H02G 15/1806* (2013.01); *B32B 1/08* (2013.01); *B32B 7/12* (2013.01); *B32B 27/06* (2013.01);
(Continued)

(58) Field of Classification Search
USPC ........ 174/110–110 PM, 113 R, 120 R–122 R
See application file for complete search history.

(56) References Cited

U.S. PATENT DOCUMENTS 3,847,694 A * 11/1974 Stewing .................. B29C 61/00
156/165
3,920,268 A * 11/1975 Stewing .................. B29C 65/42
138/155
(Continued)

FOREIGN PATENT DOCUMENTS

| CN | 1255937 A | 6/2000 |
| CN | 1789362 A | 6/2006 |

(Continued)

OTHER PUBLICATIONS

Machine translation of JP 2011 148876 A as attached to Office Action dated Jan. 29, 2016 in U.S. Appl. No. 14/365,644.
(Continued)

*Primary Examiner* — William H Mayo, III
(74) *Attorney, Agent, or Firm* — Drinker Biddle & Reath LLP

(57) ABSTRACT

A multilayered heat-recoverable article 1 includes a base material layer 10 and an adhesive layer 11 disposed on an inner side of the base material layer 10. The adhesive layer 11 does not flow at a temperature of 135° C. and includes a
(Continued)

thermoplastic resin and a viscosity characteristics modifier composed of at least one selected from the group consisting of silica, an organically treated layered silicate, and a deterioration inhibitor. In the case where the multilayered heat-recoverable article 1 is used to cover an insulated electrical wire which includes a conductor and a polyvinyl chloride layer provided on the outer periphery thereof, cracks do not occur in the polyvinyl chloride layer under heating conditions at 135° C. for 200 hours.

7 Claims, 3 Drawing Sheets

(51) Int. Cl.

| | | |
|---|---|---|
| H01B 7/00 | (2006.01) | |
| B32B 27/08 | (2006.01) | |
| B32B 7/12 | (2006.01) | |
| B32B 1/08 | (2006.01) | |
| C09J 7/02 | (2006.01) | |
| B32B 27/06 | (2006.01) | |
| B32B 27/30 | (2006.01) | |
| B32B 27/32 | (2006.01) | |
| B32B 27/34 | (2006.01) | |
| B32B 27/36 | (2006.01) | |
| C08K 3/34 | (2006.01) | |
| C08K 3/36 | (2006.01) | |
| C08K 9/04 | (2006.01) | |

(52) U.S. Cl.
CPC .............. *B32B 27/08* (2013.01); *B32B 27/304* (2013.01); *B32B 27/32* (2013.01); *B32B 27/34* (2013.01); *B32B 27/36* (2013.01); *C09J 7/02* (2013.01); *H01B 7/0045* (2013.01); *B32B 2250/02* (2013.01); *B32B 2250/24* (2013.01); *B32B 2307/206* (2013.01); *B32B 2307/306* (2013.01); *B32B 2307/7265* (2013.01); *B32B 2307/736* (2013.01); *B32B 2457/04* (2013.01); *B32B 2597/00* (2013.01); *C08K 3/346* (2013.01); *C08K 3/36* (2013.01); *C08K 9/04* (2013.01); *C09J 2203/302* (2013.01); *C09J 2205/102* (2013.01); *Y10T 428/1393* (2015.01)

(56) References Cited

U.S. PATENT DOCUMENTS

| | | | | |
|---|---|---|---|---|
| 3,983,070 | A * | 9/1976 | Penneck | C07F 7/0834 |
| | | | | 156/332 |
| 4,383,131 | A | 5/1983 | Clabburn | |
| 4,472,468 | A * | 9/1984 | Tailor | B29C 61/10 |
| | | | | 156/308.4 |
| 4,707,388 | A * | 11/1987 | Park | B29C 61/0616 |
| | | | | 156/172 |
| 4,731,273 | A * | 3/1988 | Bonk | B29C 61/10 |
| | | | | 428/34.9 |
| 4,751,121 | A | 6/1988 | Kuhnel et al. | |
| 4,751,269 | A * | 6/1988 | Bonk | C09J 133/08 |
| | | | | 428/355 AC |
| 4,965,320 | A * | 10/1990 | Overbergh | B29C 61/0616 |
| | | | | 525/149 |
| 5,091,478 | A * | 2/1992 | Saltman | C08G 81/024 |
| | | | | 525/166 |
| 5,346,539 | A | 9/1994 | Hosoi et al. | |
| 5,411,777 | A * | 5/1995 | Steele | B29C 66/73712 |
| | | | | 138/104 |
| 5,470,622 | A * | 11/1995 | Rinde | B29C 61/0616 |
| | | | | 156/84 |
| 5,747,560 | A | 5/1998 | Christiani et al. | |
| 5,767,448 | A * | 6/1998 | Dong | H05B 3/56 |
| | | | | 174/74 A |
| 5,914,160 | A | 6/1999 | Matsufuji et al. | |
| 6,146,726 | A | 11/2000 | Yoshii et al. | |
| 6,342,282 | B1 | 1/2002 | Yoshii et al. | |
| 6,548,587 | B1 | 4/2003 | Bagrodia et al. | |
| 2003/0026926 | A1 | 2/2003 | Muto et al. | |
| 2004/0176522 | A1 | 9/2004 | Schaetzle et al. | |
| 2006/0254799 | A1 | 11/2006 | Gregorek | |
| 2007/0015875 | A1 | 1/2007 | Globus et al. | |
| 2007/0149734 | A1 | 6/2007 | Sakakibara et al. | |
| 2010/0170611 | A1* | 7/2010 | Hammond | B29C 61/0616 |
| | | | | 156/49 |
| 2011/0065867 | A1 | 3/2011 | Keung et al. | |
| 2011/0272173 | A1 | 11/2011 | Shiotsuki et al. | |
| 2015/0004408 | A1 | 1/2015 | Yamasaki et al. | |
| 2015/0068800 | A1 | 3/2015 | Yamasaki et al. | |

FOREIGN PATENT DOCUMENTS

| | | | |
|---|---|---|---|
| CN | 101547970 | A | 9/2009 |
| CN | 102408617 | A | 4/2012 |
| EP | 1 398 344 | A1 | 3/2004 |
| JP | S54-84294 | A | 7/1979 |
| JP | S54-16111 | A | 12/1979 |
| JP | S61-218320 | A | 9/1986 |
| JP | S61-278585 | A | 12/1986 |
| JP | H03-207780 | A | 9/1991 |
| JP | H05-162203 | A | 6/1993 |
| JP | 5-214305 | A | 8/1993 |
| JP | H08-230037 | A | 9/1996 |
| JP | H09-45380 | A | 2/1997 |
| JP | 2000-129042 | A | 5/2000 |
| JP | 2000-506955 | A | 6/2000 |
| JP | 2001-514287 | A | 9/2001 |
| JP | 4019524 | B2 | 12/2007 |
| JP | 2008-533285 | A | 8/2008 |
| JP | 2008-251261 | A | 10/2008 |
| JP | 2009-501840 | A | 1/2009 |
| JP | 2009-507958 | A | 2/2009 |
| JP | H11-512469 | A | 10/2009 |
| JP | 2010-539252 | A | 12/2010 |
| JP | 2011-100708 | A | 5/2011 |
| JP | 2011-148876 | * | 8/2011 ............ C08L 23/088 |
| JP | 2011-148876 | A | 8/2011 |
| WO | WO 99/35206 | A1 | 7/1999 |
| WO | WO 2005/052015 | A1 | 6/2005 |

OTHER PUBLICATIONS

U.S. Office Action dated Jan. 29, 2016 that issued in U.S. Appl. No. 14/365,644 including Double Patenting Rejections on pp. 10-15.

\* cited by examiner

MULTILAYERED HEAT-RECOVERABLE ARTICLE, WIRE SPLICE, AND WIRE HARNESS

TECHNICAL FIELD

The present invention relates to a multilayered heat-recoverable article in which an adhesive layer is disposed on the inner side of a base material layer, a wire splice, and a wire harness.

BACKGROUND ART

Heat-recoverable articles, such as heat-shrinkable tubes and heat-shrinkable caps, are used as covering for joints between insulated electrical wires, wire terminals, and metal pipes for the purpose of waterproofing, corrosion protection, and the like. For example, when a joint between insulated electrical wires is covered with a heat-shrinkable tube and heating is performed, the heat-shrinkable tube shrinks, conforms to the shape of the joint, and adheres thereto, and thus the joint can be protected.

Examples of such heat-recoverable articles include a multilayered heat-recoverable article in which an adhesive layer is provided on the inner surface of a heat-shrinkable base material layer (refer to Japanese Unexamined Patent Application Publication No. 2000-129042). As the adhesive layer, a hot-melt adhesive, such as an ethylene-vinyl acetate copolymer (EVA), an ethylene-ethyl acrylate copolymer (EEA), or a polyamide resin, is used. Furthermore, the adhesive layer may be formed so as to include two thermoplastic resin layers (refer to Japanese Unexamined Patent Application Publication No. 8-230037 and Japanese Patent No. 4019524).

On the other hand, a multilayered heat-recoverable article is produced by a method in which a heat-shrinkable base material layer and an adhesive layer are each extruded into a tubular shape, then the resulting tubular body is expanded in the radial direction (the diameter is expanded) under heating, and cooling is performed to fix the shape. In some cases, in order to improve heat resistance, the extruded multilayered heat-recoverable article may be irradiated with ionizing radiation so that the heat-shrinkable base material layer can be crosslinked.

When the multilayered heat-recoverable article is used, by performing heating with an adherend being covered with the multilayered heat-recoverable article, heat shrinkage of the heat-shrinkable base material layer occurs, and at the same time, the adhesive layer is fluidized. At this time, the space between the adherend and the heat-shrinkable base material layer is filled with the fluidized adhesive layer, and thereby, the multilayered heat-recoverable article is made to adhere closely to the adherend.

One example of the adherend is a PVC insulated wire whose outermost layer is insulated by a polyvinyl chloride (PVC) layer. In the case where the multilayered heat-recoverable article is made to adhere to a PVC insulated wire, there is a concern that the polyvinyl chloride layer may be deteriorated depending on the type of multilayered heat-recoverable article, for example, depending on the composition of the adhesive layer.

Furthermore, flowability of the adhesive layer is increased by heat generated when current is passed through the PVC insulated wire, and therefore, it is assumed that the adhesive layer flows out from the heat-shrinkable base material layer. In the case where the adhesive layer flows out, adhesion between the multilayered heat-recoverable article and the PVC insulated wire is lost, and as a result, it is not possible for the multilayered heat-recoverable article to protect the PVC insulated wire from external force, moisture, and the like.

CITATION LIST

Patent Literature

PTL 1: Japanese Unexamined Patent Application Publication No. 2000-129042
PTL 2: Japanese Unexamined Patent Application Publication No. 8-230037
PTL 3: Japanese Patent No. 4019524

SUMMARY OF INVENTION

Technical Problem

The present invention has been achieved under the circumstances described above, and it is an object of the invention to provide a multilayered heat-recoverable article which can suppress deterioration of a PVC insulated wire and flow of an adhesive layer, and can appropriately protect the PVC insulated wire; and a wire splice and a wire harness, each including the multilayered heat-recoverable article.

Solution to Problem

In an aspect of the present invention which has been achieved in order to solve the problem described above, a multilayered heat-recoverable article includes a base material layer and an adhesive layer disposed on an inner side of the base material layer, characterized in that the adhesive layer does not flow at a temperature of 135° C. and includes [A] a thermoplastic resin and [B] a viscosity characteristics modifier composed of at least one selected from the group consisting of silica, an organically treated layered silicate, and a deterioration inhibitor; and in the case where the multilayered heat-recoverable article is used to cover an insulated electrical wire which includes a conductor and a polyvinyl chloride layer provided on the outer periphery thereof, cracks do not occur in the polyvinyl chloride layer under heating conditions at 135° C. for 200 hours.

The adhesive layer of the multilayered heat-recoverable article includes [A] a thermoplastic resin and [B] a viscosity characteristics modifier composed of at least one selected from the group consisting of silica, an organically treated layered silicate, and a deterioration inhibitor. Furthermore, the adhesive layer does not flow at a temperature of 135° C.; and in the case where the multilayered heat-recoverable article is used to cover an insulated electrical wire (PVC insulated wire) which includes a conductor and a polyvinyl chloride layer provided on the outer periphery thereof, cracks do not occur in the polyvinyl chloride layer under heating conditions at 135° C. for 200 hours. Accordingly, the multilayered heat-recoverable article can suppress deterioration of the PVC insulated wire and flow of the adhesive layer during current passing, and can appropriately protect the PVC insulated wire.

By incorporating at least one selected from the group consisting of silica, an organically treated layered silicate, and a deterioration inhibitor as the viscosity characteristics modifier [B], in the case where the multilayered heat-recoverable article is made to adhere to a PVC insulated wire, it is possible to suppress a decrease in flowability of the adhesive layer during heating to cause heat shrinkage of the base material layer. Accordingly, since the adhesive layer sufficiently comes into contact with the PVC insulated wire during heat shrinkage of the base material layer, it is possible to achieve good adhesion between the base material layer and the PVC insulated wire.

The viscosity characteristics modifier [B] is preferably a combination of the organically treated layered silicate and the deterioration inhibitor. By incorporating such a viscosity characteristics modifier [B], it is possible to further suppress deterioration of the PVC insulated wire and flow of the adhesive layer during current passing, and the PVC insulated wire can be more appropriately protected. When such a combination is selected as the viscosity characteristics modifier [B], excellent workability can be achieved during mixing, which is advantageous in terms of cost.

The viscosity characteristics modifier [B] is preferably a combination of the silica, the organically treated layered silicate, and the deterioration inhibitor. By incorporating such a viscosity characteristics modifier [B], it is possible to further suppress deterioration of the PVC insulated wire and flow of the adhesive layer during current passing, and the PVC insulated wire can be more appropriately protected. When such a combination is selected as the viscosity characteristics modifier [B], excellent workability can be achieved during mixing, and it is possible to suppress a variation in the thickness of the adhesive layer.

The viscosity characteristics modifier [B] is preferably composed of the silica only. By incorporating such a viscosity characteristics modifier [B], it is possible to further suppress deterioration of the PVC insulated wire and flow of the adhesive layer during current passing, and the PVC insulated wire can be more appropriately protected. In such a case, although depending on the polymer type of the thermoplastic resin [A], a deterioration inhibitor is not needed, which is advantageous in terms of cost.

The deterioration inhibitor is preferably at least one selected from the group consisting of activated clay, hydrotalcite, and a phosphorus-containing antioxidant with an acid value of 10 mgKOH/g or more. By incorporating such a deterioration inhibitor, it is possible to further suppress deterioration of the PVC insulated wire and flow of the adhesive layer during current passing, and the PVC insulated wire can be more appropriately protected.

In the multilayered heat-recoverable article, preferably, cracks do not occur in the polyvinyl chloride layer under heating conditions at 150° C. for 200 hours. When cracks do not occur in the polyvinyl chloride layer under such heating conditions, it is possible to further suppress deterioration of the PVC insulated wire and flow of the adhesive layer during current passing, and the PVC insulated wire can be protected.

The thermoplastic resin [A] is preferably at least one selected from the group consisting of an ethylene-vinyl acetate copolymer and a polyamide. By using such a thermoplastic resin [A] for the adhesive layer, good dispersibility of the viscosity characteristics modifier [B], such as the organically treated layered silicate, in the thermoplastic resin [A] can be obtained. As a result, extrudability is improved when the adhesive layer is formed, and filling property (adhesion) is improved when the multilayered heat-recoverable article is made to adhere to the adherend. Since filling property (adhesion) is improved, waterproofness can be enhanced when the multilayered heat-recoverable article is made to adhere to the PVC insulated wire.

Preferably, the base material layer includes at least one selected from the group consisting of a polyethylene, a polyester, a polyamide, and a fluororesin. Since these resins are available inexpensively, the production costs can be reduced.

In another aspect of the present invention which has been achieved in order to solve the problem described above, a wire splice includes a plurality of wires, each including a conductor and a polyvinyl chloride layer provided on the outside thereof, and a multilayered heat-recoverable article made to adhere to a joint in which the conductors of the plurality of wires are connected to each other, in which the multilayered heat-recoverable article includes a base material layer and an adhesive layer disposed on an inner side of the base material layer, in which the adhesive layer does not flow at a temperature of 135° C. and includes [A] a thermoplastic resin and [B] a viscosity characteristics modifier composed of at least one selected from the group consisting of silica, an organically treated layered silicate, and a deterioration inhibitor.

The wire splice includes a multilayered heat-recoverable article having an adhesive layer including [A] a thermoplastic resin and [B] a viscosity characteristics modifier composed of at least one selected from the group consisting of silica, an organically treated layered silicate, and a deterioration inhibitor. Therefore, the wire splice can suppress deterioration of the polyvinyl chloride layer of the wire and flow of the adhesive layer during current passing, and can appropriately protect the wire.

By incorporating at least one selected from the group consisting of silica, an organically treated layered silicate, and a deterioration inhibitor as the viscosity characteristics modifier [B] into the adhesive layer of the multilayered heat-recoverable article, in the case where the multilayered heat-recoverable article is made to adhere to a PVC insulated wire, it is possible to suppress a decrease in flowability of the adhesive layer during heating to cause heat shrinkage of the base material layer. Accordingly, since the adhesive layer sufficiently comes into contact with the PVC insulated wire during heat shrinkage of the base material layer, it is possible to achieve good adhesion between the base material layer and the PVC insulated wire. As a result, in the wire splice, waterproofness can be improved because of good adhesion between the wire and the multilayered heat-recoverable article. Furthermore, waterproofness can be appropriately maintained because of suppression of flow of the adhesive layer during current passing.

In another aspect of the present invention which has been achieved in order to solve the problem described above, a wire harness includes a plurality of wires, each including a conductor and a polyvinyl chloride layer provided on the outside thereof, and a multilayered heat-recoverable article made to adhere to the plurality of wires, in which the multilayered heat-recoverable article includes a base material layer and an adhesive layer disposed on an inner side of the base material layer, in which the adhesive layer does not flow at a temperature of 135° C. and includes [A] a thermoplastic resin and [B] a viscosity characteristics modifier composed of at least one selected from the group consisting of silica, an organically treated layered silicate, and a deterioration inhibitor.

The wire harness includes a multilayered heat-recoverable article having an adhesive layer including [A] a thermoplastic resin and [B] a viscosity characteristics modifier composed of at least one selected from the group consisting of silica, an organically treated layered silicate, and a deterioration inhibitor. Therefore, the wire harness can suppress deterioration of the polyvinyl chloride layer of the wire and flow of the adhesive layer during current passing, and can appropriately protect the wire.

By incorporating at least one selected from the group consisting of silica, an organically treated layered silicate, and a deterioration inhibitor as the viscosity characteristics modifier [B] into the adhesive layer of the multilayered heat-recoverable article, in the case where the multilayered heat-recoverable article is made to adhere to a PVC insulated wire, it is possible to suppress a decrease in flowability of the adhesive layer during heating to cause heat shrinkage of the base material layer. Accordingly, since the adhesive layer sufficiently comes into contact with the PVC insulated wire during heat shrinkage of the base material layer, it is possible to achieve good adhesion between the base material layer and the PVC insulated wire. As a result, in the wire harness, waterproofness can be improved because of good adhesion between the wire and the multilayered heat-recoverable article. Furthermore, waterproofness can be appropriately maintained because of suppression of flow of the adhesive layer during current passing.

The expression "not flowing at a temperature of 135° C." means that, in the case where an insulated electrical wire having a polyvinyl chloride layer is covered with the multilayered heat-recoverable article, even when left to stand under heating at 135° C. for 200 hours with the multilayered heat-recoverable article being placed in a horizontal position, the adhesive layer (adhesive composition) does not flow out from the base material layer.

The expression "cracks do not occur in the polyvinyl chloride layer" means that, in the wire harness in which the multilayered heat-recoverable article is made to adhere to the PVC wire, when visually confirmed after heating at 135° C. for 200 hours, cracks do not occur in the polyvinyl chloride layer to such an extent that the conductor is visible.

Advantageous Effects of Invention

In the multilayered heat-recoverable article, and the wire splice and the wire harness, each including the multilayered heat-recoverable article, according to the present invention, it is possible to suppress deterioration of a PVC insulated wire and flow of the adhesive layer, and as a result, the PVC insulated wire can be appropriately protected.

DESCRIPTION OF EMBODIMENTS

Figure 1:
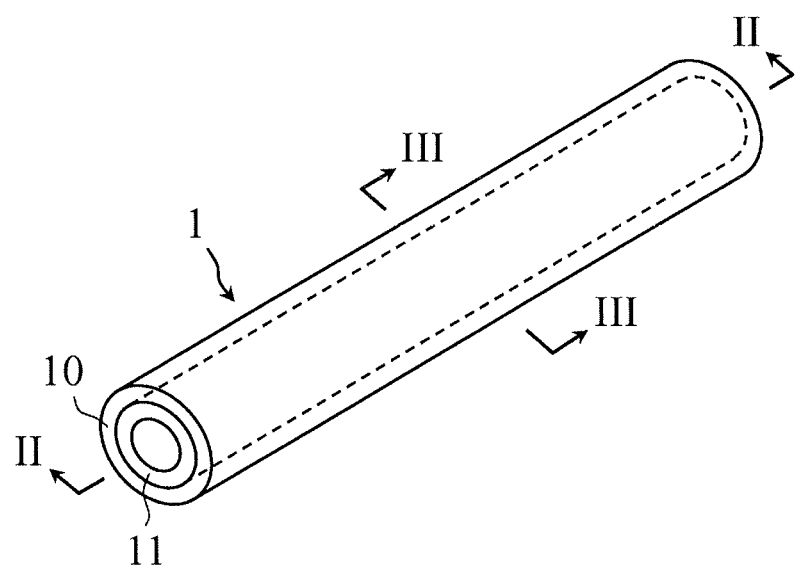
FIG. 1 is an overall perspective view showing an embodiment of a multilayered heat-recoverable article according to the present invention.
Figure 2:
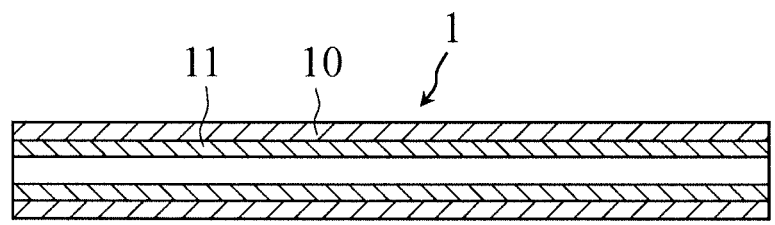
FIG. 2 is a cross-sectional view taken along the line II-II of FIG. 1.
Figure 3:
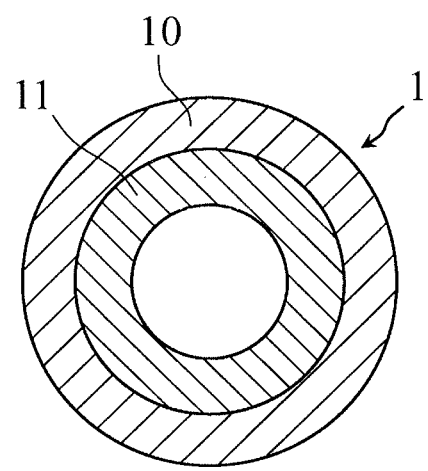
FIG. 3 is a cross-sectional view taken along the line III-III of FIG. 1.

A multilayered heat-recoverable article 1 shown in FIGS. 1 to 3 is used for covering of a joint between PVC insulated wires (electrical wires and cables), wire terminal treatment using a PVC insulated wire, tying PVC insulated wires together, and the like. The multilayered heat-recoverable article 1 includes a base material layer 10 and an adhesive layer 11 disposed on the inner side of the base material layer 10. The multilayered heat-recoverable article 1 is cut to an appropriate length. The size may be selected according to intended use, and a long multilayered heat-recoverable article may be formed.

The adhesive layer 11 enhances adhesion of the base material layer 10 to an adherend portion and improves waterproofness or the like. The adhesive layer 11 is composed of an adhesive composition including [A] a thermoplastic resin and [B] a viscosity characteristics modifier. The adhesive layer 11 does not flow at a temperature of 135° C., and in the case where the multilayered heat-recoverable article is used to cover an insulated electrical wire which includes a conductor and a polyvinyl chloride layer provided on the outer periphery thereof, cracks do not occur in the polyvinyl chloride layer under heating conditions at 135° C. for 200 hours.

<[A] Thermoplastic Resin>

As the thermoplastic resin [A], any thermoplastic resin can be selected and used depending on the type of resin used for the base material layer 10, the surface composition of the PVC insulated wire, or the like. Examples of the thermoplastic resin [A] include an ethylene-vinyl acetate copolymer (EVA), a polyamide, an ethylene-ethyl acrylate copolymer (EEA), and a saturated copolymerized polyester.

The thermoplastic resin [A] is preferably at least one selected from the group consisting of an ethylene-vinyl acetate copolymer and a polyamide. By using such a thermoplastic resin [A] for the adhesive layer, good dispersibility of the viscosity characteristics modifier [B], such as the organically treated layered silicate, in the thermoplastic resin [A] can be obtained. As a result, extrudability is improved when the adhesive layer 11 is formed, and filling property (adhesion) is improved when the multilayered heat-recoverable article 1 is made to adhere to a PVC insulated wire. An ethylene-vinyl acetate copolymer and a polyamide may be used alone or as a mixture thereof. More preferably, an ethylene-vinyl acetate copolymer is used alone or in combination with a polyamide.

The content of vinyl acetate in the ethylene-vinyl acetate copolymer is preferably 12% to 46% by mass. When the content of vinyl acetate is 12% by mass or more, dispersion of the viscosity characteristics modifier [B], such as the organically treated layered silicate, in the thermoplastic resin [A] is facilitated. On the other hand, when the content of vinyl acetate exceeds 46% by mass, sticking of the adhesive composition to a die, a mold, or the like occurs, and handling becomes difficult.

Preferably, the thermoplastic resin [A] has a melt flow rate (MFR) of 15 g/10 min to 1,000 g/10 min. The MFR is an index showing the flowability of a resin. When the MFR exceeds 1,000 g/10 min, the flowability is excessively high, which may make it difficult to stably extrude the adhesive layer 11 in some cases. On the other hand, when the MFR is less than 15 g/10 min, there is a concern that it may not be possible to sufficiently secure the flowability during heat shrinkage of the base material layer 10 when the multilayered heat-recoverable article 1 is used. Therefore, by using the thermoplastic resin [A] having an MFR of 15 g/10 min to 1,000 g/10 min, it is possible to obtain an adhesive composition (adhesive layer 11) having better flowability. Consequently, the extrudability of the adhesive composition is improved, and the adhesion of the multilayered heat-recoverable article 1 to the PVC insulated wire is improved. More preferably, as the thermoplastic resin [A] used for the adhesive composition, a thermoplastic resin having an MFR of 100 g/10 min to 800 g/10 min is used. Herein, the MFR is defined as the value measured, using an extrusion plastometer stipulated in JIS K6760, under the conditions at a temperature of 190° C. and a load of 2.16 kg in accordance to JIS K7210.

<[B] Viscosity Characteristics Modifier>

The viscosity characteristics modifier [B] modifies the viscosity characteristics of the adhesive composition (adhesive layer 11) and is composed of at least one selected from the group consisting of silica, an organically treated layered silicate, and a deterioration inhibitor. By incorporating such a viscosity characteristics modifier, it is possible to suppress deterioration of the PVC insulated wire and flow of the adhesive layer 11 during current passing, and the PVC insulated wire can be appropriately protected. Furthermore, in the case where the multilayered heat-recoverable article 1 is made to adhere to a PVC insulated wire, it is possible to suppress a decrease in flowability of the adhesive layer 11 during heating to cause heat shrinkage of the base material layer 10. Accordingly, since the adhesive layer 11 sufficiently comes into contact with the PVC insulated wire during heat shrinkage of the base material layer 10, it is possible to achieve good adhesion between the base material layer 10 and the PVC insulated wire.

As the viscosity characteristics modifier [B], combined use of at least two: the organically treated layered silicate and the deterioration inhibitor, combined use of at least three: the silica, the organically treated layered silicate, and the deterioration inhibitor, or single use of the silica is preferable. By incorporating the viscosity characteristics modifier [B] in such a combination, it is possible to more appropriately suppress deterioration of the PVC insulated wire and flow of the adhesive layer 11 during current passing, and the PVC insulated wire can be more appropriately protected. In the case of combined use of two: the organically treated layered silicate and the deterioration inhibitor, excellent workability can be achieved during mixing, which is advantageous in terms of cost. In the case of combined use of three: the silica, the organically treated layered silicate, and the deterioration inhibitor, excellent workability can be achieved during mixing, and it is possible to suppress a variation in the thickness of the adhesive layer 11. In the case of single use of the silica, although depending on the polymer type of the thermoplastic resin [A], a deterioration inhibitor is not needed, which is advantageous in terms of cost.

As the silica, use of silica having a specific surface (determined by the BET method) of 100 to 400 $m^2/g$ is preferable. As the silica, hydrophilic fumed silica is preferable.

The organically treated layered silicate is a substance obtained by organically treating a layered silicate (clay mineral or clay). Examples of the layered silicate include montmorillonite, bentonite, and smectite. Furthermore, either a natural material or a synthetic material can be used. As the organic compound used for the organic treatment of the layered silicate, for example, a quaternary ammonium salt may be used. As the quaternary ammonium salt, dimethyl distearyl ammonium chloride and benzyl dimethyl stearyl ammonium chloride are preferable.

In the organically treated layered silicate, interlayer cations, such as magnesium ions, sodium ions, or calcium ions, are intercalated between adjacent planar silicate layers, and a layered crystal structure is maintained. The interlayer cations are ion-exchanged with organic cations by organic treatment. By introducing organic cations between adjacent planar silicate layers, the interlayer distance increases in the silicate. As a result, layer separation occurs in the silicate, and the separated layers are detached, resulting in an increase in the surface area. Accordingly, in the organically treated layered silicate, dispersibility in the thermoplastic resin [A] is improved compared with a layered silicate that is not organically treated, which can contribute to improvement of extrudability.

The specific surface of the organically treated layered silicate [B] is preferably 3 to 50 $m^2/g$. By incorporating such an organically treated layered silicate [B], excellent workability can be achieved during mixing with the thermoplastic resin [A].

The deterioration inhibitor inhibits deterioration of a PVC insulated wire, in particular, an insulating layer serving as an outermost layer, to which the multilayered heat-recoverable article 1 is made to adhere. Typically, the deterioration inhibitor inhibits occurrence of cracks in the outermost layer due to basic components, such as nitrogen-containing compounds, contained in the outermost layer of the PVC insulated wire or the adhesive layer 11 of the multilayered heat-recoverable article 1. The deterioration inhibitor can also have a function of improving the viscosity characteristics of the adhesive composition. The deterioration inhibitor may be selected depending on the factors that cause deterioration of the PVC insulated wire. For example, a deterioration inhibitor that can inhibit deterioration of the PVC insulated wire due to basic components is used. As the deterioration inhibitor, for example, a compound that inhibits dehydrochlorination reaction due to basic components, or a compound capable of capturing or neutralizing hydrogen chloride, chloride ions, or the like generated by dehydrochlorination reaction can be used.

The deterioration inhibitor is preferably at least one selected from the group consisting of activated clay, hydrotalcite, and a phosphorus-containing antioxidant with an acid value of 10 mgKOH/g or more. By incorporating such a deterioration inhibitor, it is possible to further suppress deterioration of the PVC insulated wire and flow of the adhesive layer during current passing, and the PVC insulated wire can be more appropriately protected.

Activated clay is obtained by subjecting acid clay to heat and acid treatment such that the specific surface is increased, and has a property of adsorbing a nitrogen-containing compound. Hydrotalcite is a carbonate mineral having a layered structure and has a property of intercalating anions between adjacent layers. A phosphorus-containing antioxidant (with an acid value of 10 mgKOH/g or more) can capture hydrogen chloride generated by dehydrochlorination reaction.

As the phosphorus-containing antioxidant (with an acid value of 10 mgKOH/g or more), an acid phosphate is preferable. Examples of the acid phosphate include ethyl acid phosphate, oleyl acid phosphate, butyl acid phosphate, dibutyl pyrophosphate, butoxyethyl acid phosphate, 2-ethylhexyl acid phosphate, alkyl (C12, C14, C16, C18) acid phosphate, isotridecyl acid phosphate, tetracosyl acid phosphate, ethylene glycol acid phosphate, 2-hydroxyethyl methacrylate acid phosphate, dibutyl phosphate, and bis(2-ethylhexyl)phosphate. Among these acid phosphates, ethyl acid phosphate and oleyl acid phosphate are more preferable.

As the deterioration inhibitor, "GALLEON EARTH V2" (manufactured by Mizusawa Industrial Chemicals, Ltd.), which is activated clay, and "DHT-4A" (manufactured by Kyowa Chemical Industry Co., Ltd.), which is hydrotalcite, are preferably used.

<Adhesive Composition>

The content of the viscosity characteristics modifier [B] in the adhesive composition is selected such that the adhesive layer 11 (adhesive composition) does not flow at a temperature of 135° C., and in the case where the multilayered heat-recoverable article 1 is used to cover an insulated electrical wire (PVC insulated wire) which includes a polyvinyl chloride layer, cracks do not occur in the polyvinyl chloride layer under heating conditions at 135° C. (preferably 150° C.) for 200 hours. The content of the viscosity characteristics modifier [B] is selected in accordance with the type of thermoplastic resin [A] used, the type of viscosity characteristics modifier [B], and the combination constituting the viscosity characteristics modifier [B].

The content of the viscosity characteristics modifier [B] is preferably 1 to 20 parts by mass, more preferably 2 to 7 parts by mass, relative to 100 parts by mass of the thermoplastic resin [A].

The content of silica serving as the viscosity characteristics modifier [B] is preferably 1 to 20 parts by mass, more preferably 2 to 5 parts by mass, relative to 100 parts by mass of the thermoplastic resin [A].

The content of the organically treated layered silicate serving as the viscosity characteristics modifier [B] is preferably 1 to 20 parts by mass, more preferably 1 to 3 parts by mass, relative to 100 parts by mass of the thermoplastic resin [A]. The organically treated layered silicate is treated with a quaternary ammonium salt in one example, and therefore, as the content increases, deterioration of the polyvinyl chloride insulating layer in the PVC insulated wire might be promoted. Accordingly, in the case where an organically treated layered silicate serving as the viscosity characteristics modifier [B] is used, preferably, the content thereof is decreased or a deterioration inhibitor is used in combination with the organically treated layered silicate as the viscosity characteristics modifier [B].

The content of the deterioration inhibitor serving as the viscosity characteristics modifier [B] is preferably 1 to 20 parts by mass, more preferably 1 to 3 parts by mass, relative to 100 parts by mass of the thermoplastic resin [A].

In the case where an organically treated layered silicate and a deterioration inhibitor are used in combination as the viscosity characteristics modifier [B], the content of the deterioration inhibitor is preferably 50% to 400% by mass relative to the organically treated layered silicate. When the content of the deterioration inhibitor is less than 50% by mass, the effect of inhibiting deterioration for the organically treated layered silicate may not be sufficiently obtained in some cases. Therefore, there is a possibility that deterioration of the PVC insulated wire will not be suppressed sufficiently. On the other hand, when the content of the deterioration inhibitor exceeds 400% by mass, the dispersibility of the organically treated layered silicate in the thermoplastic resin [A] may be decreased in some cases. Therefore, there is a concern that it may not be possible to sufficiently obtain the characteristics anticipated by incorporating the organically treated layered silicate in the adhesive composition, such as extrudability of the adhesive composition during molding, and flowability of the adhesive layer 11 at the time of adhesion of the multilayered heat-recoverable article 1. As a result, there is a possibility that sufficient waterproofness will not be provided for the PVC insulated wire when the multilayered heat-recoverable article 1 is made to adhere to the PVC insulated wire. The content of the deterioration inhibitor is more preferably 100% to 300% by mass relative to the content of the organically treated layered silicate. In this case, it is possible to more reliably obtain the effect of suppressing deterioration of the PVC coated wire and securing waterproofness while sufficiently securing the dispersibility of the organically treated layered silicate in the thermoplastic resin [A].

By incorporating the viscosity characteristics modifier in the range described above into the adhesive composition, the adhesive layer does not flow at a temperature of 135° C., and the shear viscosity of the adhesive composition is preferably adjusted to be 300 Pa·s or more at a shear rate of $0.1\ s^{-1}$ and 200 Pa·s or less at a shear rate of $100\ s^{-1}$. The shear viscosity is preferably 1,000 Pa·s or more at a shear rate of $0.1\ s^{-1}$. Herein, the shear viscosity is the value measured at 150° C. using a rotary rheometer.

By setting the shear viscosity of the adhesive composition to be 300 Pa·s or more at a shear rate of $0.1\ s^{-1}$, the flow of the adhesive composition during extrusion of the adhesive layer 11 can be suppressed, and the variation in the thickness of the adhesive layer 11 can be further suppressed. That is, when the adhesive composition passes through a die during extrusion, a high shear stress is applied to the adhesive composition, and the flowability is increased. On the other hand, after the adhesive composition has passed through the die, the shear stress applied to the adhesive composition decreases. Accordingly, when the viscosity of the adhesive composition is low, the adhesive layer 11 formed after passing through the die is deformed, and a variation in the thickness occurs. In some cases, the hollow portion inside the adhesive layer 11 may be filled with the adhesive composition. In contrast, when the shear viscosity of the adhesive composition is set to be 300 Pa·s or more at a shear rate of $0.1\ s^{-1}$, the viscosity can be maintained such that the flow of the adhesive composition can be suppressed immediately after passing through the die. Thus, a variation in the thickness of the adhesive layer 11 formed after passing through the die can be further suppressed. In addition, flow of the adhesive layer 11 can be further suppressed at the time when current passes through the PVC insulated wire, and therefore, flow of the adhesive layer 11 at the time of use of the PVC insulated wire can be further suppressed.

An adhesive composition having a shear viscosity of about 300 Pa·s at 150° C. and at a shear rate of $0.1\ s^{-1}$ has relatively high flowability. However, even in the case of the adhesive composition having a shear viscosity of about 300 Pa·s at a shear rate of $0.1\ s^{-1}$, by contriving a die shape, deformation of the adhesive layer 11 formed after passing through the die can be suppressed, and extrusion of the adhesive layer 11 can be performed without any problem.

On the other hand, when the shear viscosity of the adhesive composition is set to be 200 Pa·s or less at a shear rate of $100\ s^{-1}$, a decrease in the flowability of the adhesive layer 11 can be further suppressed during heating for causing heat shrinkage of the base material layer 10 when the multilayered heat-recoverable article 1 is made to adhere to the PVC insulated wire. Accordingly, the adhesive layer 11 is sufficiently brought into contact with the PVC insulated wire at the time of heat shrinkage of the base material layer 10, and thus good adhesion between the base material layer 10 and the PVC insulated wire can be achieved.

Additives other than the thermoplastic resin [A] and the viscosity characteristics modifier [B] may be added to the adhesive composition. Examples of the additives include a coloring agent, a lubricant, a heat stabilizer, and an ultraviolet absorber. The adhesive composition can be produced by mixing the thermoplastic resin [A], the viscosity characteristics modifier [B], and as necessary, additives other than these using a mixer, such as an open roll mixer, a pressure kneader, a single screw mixer, or a twin screw mixer.

<Base Material Layer>

The base material layer 10 is formed in the shape of a tube which reduces in diameter when heated. The resin composition constituting the base material layer 10 includes at least one selected from the group consisting of a polyethylene, a polyester, a polyamide, and a fluororesin, and as necessary, additives are mixed therein. Examples of the additives include a flame retardant, an antioxidant, a coloring agent, a lubricant, a heat stabilizer, and an ultraviolet absorber.

<Method for Producing Multilayered Heat-Recoverable Article>

In the production process of the multilayered heat-recoverable article 1, first, a resin composition for the base material layer 10 and an adhesive composition for the adhesive layer 11 are extruded using a melt extruder to obtain a multilayered extruded article. The resulting multilayered extruded article is heated to a temperature equal to or higher than the melting point, and in that state, the multilayered extruded article is expanded to a predetermined external shape by a method of introducing compressed air thereinto, or the like, and cooled to fix the shape. Thereby, the multilayered heat-recoverable article 1 is obtained. In the multilayered extruded article which has been extruded, the component of the base material layer 10 may be crosslinked to improve heat resistance. Crosslinking can be performed, for example, by a method of crosslinking using irradiation with ionizing radiation, chemical crosslinking, thermal crosslinking, or the like.

The size of the multilayered heat-recoverable article 1 can be designed according to intended use or the like. Regarding the size of the base material layer 10 of the multilayered heat-recoverable article 1, before expansion, for example, the inside diameter is 1.0 to 30 mm, and the thickness is 0.1 to 10 mm. Regarding the size of the adhesive layer 11 of the multilayered heat-recoverable article 1, before expansion, for example, the thickness is 0.1 to 10 mm, and the inside diameter is 0.1 to 8.5 mm. In the multilayered heat-recoverable article 1, the adhesive composition used for the adhesive layer 11 has excellent extrudability. Therefore, even in the case where the inside diameter of the adhesive layer 11 is decreased to 1.0 mm or less, extrusion can be performed satisfactorily. The sizes of the base material layer 10 and the adhesive layer 11 described above are only examples and do not restrict the multilayered heat-recoverable article of the present invention.

The multilayered heat-recoverable article 1 may be formed by separately extruding the base material layer 10 and the adhesive layer 11. In such a case, the adhesive layer 11 is set inside the base material layer 10 which has been expanded after extrusion. The resulting multilayered heat-recoverable article is used by being made to adhere to a PVC insulated wire, and shrinking the base material layer 10.

Figure 4:
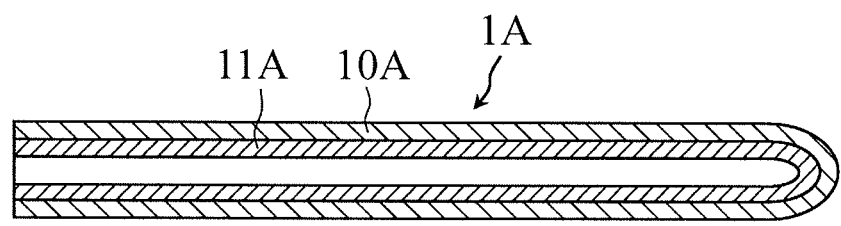
FIG. 4 is a cross-sectional view, which corresponds to FIG. 2, showing another embodiment of a multilayered heat-recoverable article according to the present invention.

In addition to the multilayered heat-recoverable article 1 shown in FIGS. 1 to 3 in which the base material layer 10 is formed in a tubular shape, the multilayered heat-recoverable article of the present invention may be a multilayered heat-recoverable article 1A shown in FIG. 4 in which a base material layer 10A is formed in a cap shape. In the multilayered heat-recoverable article 1A, one end of the multilayered heat-recoverable article 1 is subjected to heat shrinkage and closed, and thereby, an adhesive layer 11A is disposed inside the cap-shaped base material layer 10A. The multilayered heat-recoverable article 1A can be used, for example, for wire terminal treatment.

<Wire Splice and Wire Harness>

The multilayered heat-recoverable article 1 or 1A of the present invention can be used for protection, waterproofing, and the like of a PVC insulated wire as described above. Specifically, the multilayered heat-recoverable article 1 or 1A can be used for a wire splice and a wire harness.

Figure 5:
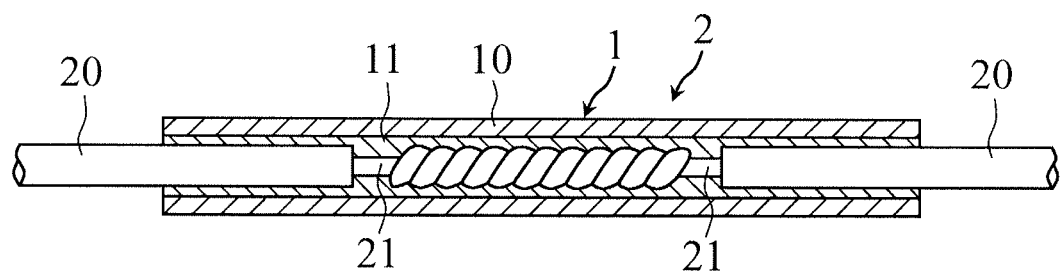
FIG. 5 is a cross-sectional view, which corresponds to FIG. 2, showing an embodiment of a wire splice according to the present invention.
Figure 6:
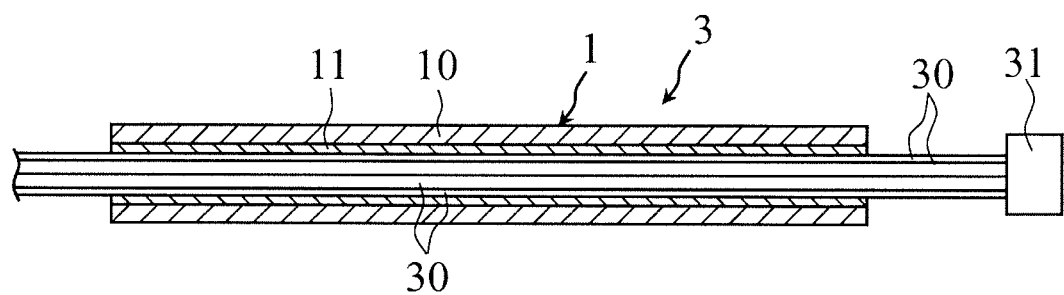
FIG. 6 is a cross-sectional view, which corresponds to FIG. 2, showing an embodiment of a wire harness according to the present invention.
Figure 7:
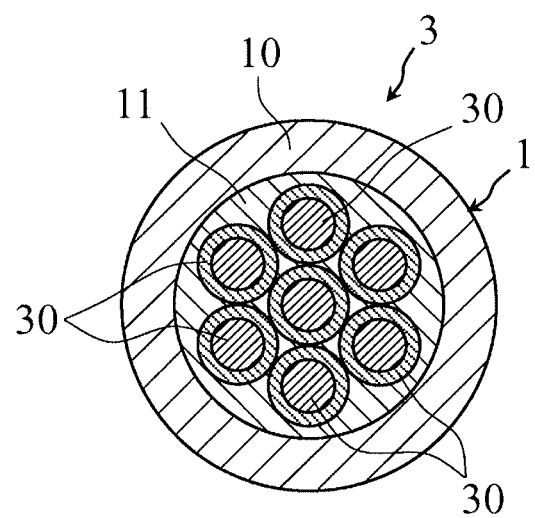
FIG. 7 is a cross-sectional view, which corresponds to FIG. 3, of the wire harness shown in FIG. 6.

FIG. 5 shows an example in which the multilayered heat-recoverable article 1 is used in a wire splice 2, and FIGS. 6 and 7 show an example in which the multilayered heat-recoverable article 1 is used in a wire harness 3.

In the wire splice 2 shown in FIG. 5, conductor wires 21 of a pair of wires 20 are connected to each other and the multilayered heat-recoverable article 1 is made to adhere to the joint thereof. The wire 20 is an electrical wire or cable (PVC insulated wire) in which an outermost layer is covered with a PVC insulating layer which contains PVC as a main component. Here, the term "main component" refers to a component whose content is highest among the components constituting the PVC insulating layer. The content of polyvinyl chloride in the PVC insulating layer is, for example, 50% to 95% by mass. In such a wire splice 2, the multilayered heat-recoverable article 1 can contribute to protection and waterproofing of the joint.

In the wire harness 3 shown in FIGS. 6 and 7, a plurality of wires 30 are tied together by the multilayered heat-recoverable article 1, and a multi-pin connector 31 is provided on the ends of the plurality of wires 30. The wire 30 is the same as the wire 20 of the wire splice 2 shown in FIG. 5. In the wire harness 3, the multilayered heat-recoverable article 1 not only has a function of tying the wires 30 together, but also has a function of protecting the individual wires 30 and providing waterproofness.

Note that, in some cases, the wire splice and the wire harness according to the present invention may not be strictly distinguished from each other. A wire splice may also serve as a wire harness in some cases.

The multilayered heat-recoverable article, the wire splice, and the wire harness according to the present invention are not limited to the embodiments described above.

The multilayered heat-recoverable article of the present invention may be formed in a sheet shape, in addition to in a tube shape and in a cap shape. In a sheet-shaped multilayered heat-recoverable article, an adhesive layer is disposed on one surface of a base material layer. For example, the sheet-shaped multilayered heat-recoverable article is used, in the state in which it is wrapped around a PVC insulated wire, by subjecting the base material layer to heat shrinkage. That is, in the sheet-shaped multilayered heat-recoverable article, in the state in which the base material layer is wrapped around the adherend, the adhesive layer is disposed on the inner side of the base material layer.

In the wire splice of the present invention, as long as the multilayered heat-recoverable article is made to adhere to a joint between wires, a wire may be connected to a plurality of wires, a plurality of wires may be connected to a plurality of wires, or ends of a plurality of wires may be connected collectively as in wire terminal treatment. Other configurations may also be used.

The wire harness of the present invention may be configured as a so-called flat harness in which a plurality of wires are tied together in a planar shape. Other configurations may also be used.

EXAMPLES

The present invention will be described more in detail on the basis of examples. However, it is to be understood that the examples do not limit the scope of the present invention.

Examples 1 to 16 and Comparative Examples 1 to 4

Production of Multilayered Heat-Recoverable Article

Each multilayered heat-recoverable article was produced by a production method I or a production method II, which will be described below, after an adhesive composition for an adhesive layer and a base material layer resin composition for a base material layer had been prepared.

Each adhesive composition was prepared by melt-mixing the thermoplastic resin [A] and the viscosity characteristics modifier [B] with the compositional ratio shown in Table I. The compounds used for preparation of the adhesive compositions are shown in Table II.

The base material layer resin composition was prepared by melt-mixing additives to polyethylene having a melting point of 125° C.

Two types of base material layer resin composition (a base material layer resin composition I and a base material layer resin composition II) containing different amounts of additives were prepared. The base material layer resin composition I was prepared by adding 5% by mass of additives (an antioxidant, a lubricant, etc.) to polyethylene. The base material layer resin composition II was prepared by adding 30% by mass of additives (an antioxidant, a lubricant, a flame retardant, etc.) to polyethylene.

<Production Method I>

In the production method I, the adhesive layer and the base material layer were simultaneously extruded using different extruders to produce a multilayered heat-recoverable article in which the adhesive layer was disposed on the inner surface of the base material layer.

The base material layer was formed with an outside diameter of 4.6 mm, an inside diameter of 2.8 mm, and a thickness of 0.9 mm.

The adhesive layer was formed with an outside diameter of 2.8 mm, an inside diameter of 0.6 mm, and a thickness of 1.1 mm.

<Production Method II>

In the production method II, the base material layer and the adhesive layer were separately formed. The base material layer and the adhesive layer are integrated at the time of use and used as a multilayered heat-recoverable article.

The sizes of the base material layer and the adhesive layer are the same as those of the base material layer and the adhesive layer of the heat-recoverable article produced by the production method I.

(Evaluation of Multilayered Heat-Recoverable Article)

<PVC Wire Deterioration Test>

In a PVC wire deterioration test, an evaluation was made using a wire harness including a multilayered heat-recoverable article.

A wire harness was produced by a method in which four PVC wires were passed through a multilayered heat-recoverable article, the resulting workpiece was placed horizontally on the floor of a thermostat oven at 150° C., and heating was performed for 120 seconds to shrink the base material layer.

Each of the PVC wires was obtained by covering a conductor wire with a polyvinyl chloride insulating layer, followed by crosslinking by irradiation, and had an outside diameter of 1.5 mm. The polyvinyl chloride insulating layer included 100 parts by mass of PVC, 50 parts by mass of a trimellitate serving as a plasticizer, and 10 parts by mass of each of a lubricant and a stabilizer.

In a deterioration test, the resulting wire harness was placed horizontally on the floor of a thermostat oven at a predetermined temperature, and heating was performed for 200 hours. Then, it was visually confirmed whether or not cracks occurred in the polyvinyl chloride insulating layer. In a deterioration test 1, the temperature of the thermostat oven was set at 135° C., and in a deterioration test 2, the temperature of the thermostat oven was set at 150° C.

In the PVC wire deterioration test, the case where cracks were not visually observed to have occurred in the polyvinyl chloride insulating layer of the PVC wire was evaluated to be "A", and the case where cracks occurred and the conductor wire was visible was evaluated to be "B".

<Adhesive Flow Test>

In an adhesive flow test, after the deterioration test in which the wire harness was placed horizontally, it was visually confirmed whether or not the adhesive flowed out from the end of the multilayered heat-recoverable article.

In an adhesive flow test 1, the presence or absence of adhesive flow was confirmed after the deterioration test 1 (135° C., 200 hours). In an adhesive flow test 2, the presence or absence of adhesive flow was confirmed after the deterioration test 2 (150° C., 200 hours).

In the flow test, the case where the adhesive did not drop to the floor was evaluated to be "A", and the case where the adhesive flowed and dropped to the floor was evaluated to be "B".

<Adhesive Sagging Test>

In an adhesive sagging test, a wire harness was vertically placed in a thermostat oven at 150° C. and left to stand for 200 hours. It was confirmed whether or not the adhesive flowed out from the multilayered heat-recoverable article, and in the case where the flow was confirmed, the moving distance of the adhesive was measured.

The wire harness was produced by the same method as that of the wire harness used in the deterioration test described above. A PVC wire with a length of 150 mm and a multilayered heat-recoverable article with a length of 50 mm were used. The multilayered heat-recoverable article was fixed at a position where the PVC wire extends from the ends of the multilayered heat-recoverable article by a length of 50 mm.

The wire harness was vertically placed at the position where the distance between the lower end of the wire harness and the floor was 50 mm.

Note that the sagging test was performed only on wire harnesses which were evaluated to be "A" in the waterproofness test and in which deterioration of the PVC wire was not confirmed in the deterioration tests 1 and 2.

In Table I, the expression "-" under the item of sagging test indicates that the test was not performed, and the description ">50" indicates that the sagged adhesive reached the floor (the sagging distance was 50 mm or more).

<Waterproofness Test>

In a waterproofness test, an evaluation was made using a wire splice including a multilayered heat-recoverable article.

A wire splice was produced by a method in which a conductor wire of a PVC wire and a conductor wire of each of four PVC wires were welded together, the welded portion was covered with a multilayered heat-recoverable article, the resulting workpiece was placed horizontally on the floor of a thermostat oven at 180° C., and heating was performed for 90 seconds to shrink the base material layer. In the wire splice thus produced, one PVC wire extended from one end of the multilayered heat-recoverable article, and four PVC wires extended from the other end.

In the waterproofness test, the resulting wire splice was placed in water, air at 200 kPa was blown for 30 seconds into one end of the multilayered heat-recoverable article from which one PVC wire extended, and it was confirmed whether or not bubbles were generated from the other end from which four PVC wires extended. In the waterproofness test, the case where bubbles were not generated was evaluated to be "A", and the case where bubbles were generated was evaluated to be "B".

TABLE II-continued

| | | |
|---|---|---|
| | | (MFR 100 g/10 min) |
| | Polyamide 2 | Including a dimer acid as a dicarboxylic acid (MFR 300 g/10 min) |
| [B] | Silica 1 | "AEROSIL 200" (hydrophilic fumed silica, specific surface 200 $m^2/g$): Nippon Aerosil Co., Ltd. |
| | Silica 2 | "AEROSIL 380" (hydrophilic fumed silica, specific surface 380 $m^2/g$): Nippon Aerosil Co., Ltd. |
| | Organically treated layered silicate | "Osmos N" (layered silicate with a specific surface of 9 $m^2/g$ treated with dimethyl distearyl ammonium chloride): manufactured by Shiraishi Kogyo Kaisha, Ltd. |
| | Activated clay (deterioration inhibitor) | "GALLEON EARTH V2" (average particle size 25 μm, pH 3.3): manufactured by Mizusawa Industrial Chemicals, Ltd. |
| | Hydrotalcite | "DHT-4A" (pH 9, specific surface 10 $m^2/g$): |

TABLE I

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 |
| Composition (parts by mass) | (Adhesive layer) [A] Thermoplastic resin | EVA1 | 100 | | 100 | 100 | | | | 100 | 100 | 100 |
| | | EVA2 | | 100 | | | | | | | | |
| | | Polyamide 1 | | | | | 100 | | 100 | | | |
| | | Polyamide 2 | | | | | | 100 | | | | |
| | (Adhesive layer) [B] viscosity characteristics modifier | Silica 1 | 5 | 5 | 2 | | 5 | 5 | 5 | | | |
| | | Silica 2 | | | | 5 | | | | | | |
| | | Organically treated layered silicate | | | | | | | | 3 | 1 | 3 |
| | | Activated clay | | | | | 2 | 2 | | 3 | 3 | |
| | | Hydrotalcite | | | | | | | 2 | | | 3 |
| Base material layer resin composition | | | I | I | I | I | I | I | I | I | I | I |
| Production method of multilayered heat-recoverable article | | | I | I | I | I | I | I | I | I | I | I |
| Evaluation | | PVC wire deterioration test 1 | A | A | A | A | A | A | A | A | A | A |
| | | PVC wire deterioration test 2 | A | A | A | A | A | A | A | A | A | A |
| | | Adhesive flow test 1 | A | A | A | A | A | A | A | A | A | A |
| | | Adhesive flow test 2 | A | A | A | A | A | A | A | A | A | A |
| | | Sagging test (Moving distance mm) | 0 | 0 | 0 | 0 | 0 | 0 | 0 | 0 | 0 | 0 |
| | | Waterproofness test | A | A | A | A | A | A | A | A | A | A |

| | | | Example | | | | | | Comparative Example | | | |
|---|---|---|---|---|---|---|---|---|---|---|---|---|
| | | | 11 | 12 | 13 | 14 | 15 | 16 | 1 | 2 | 3 | 4 |
| Composition (parts by mass) | (Adhesive layer) [A] Thermoplastic resin | EVA1 | 100 | 100 | 100 | 100 | 100 | 100 | 100 | 100 | | |
| | | EVA2 | | | | | | | | | | |
| | | Polyamide 1 | | | | | | | | | 100 | 100 |
| | | Polyamide 2 | | | | | | | | | | |
| | (Adhesive layer) [B] viscosity characteristics modifier | Silica 1 | 2 | 5 | | 5 | | 25 | | | | 5 |
| | | Silica 2 | | | | | | | | | | |
| | | Organically treated layered silicate | 2 | | 1 | | 1 | | | 3 | | |
| | | Activated clay | 3 | | 3 | | 3 | | | | | |
| | | Hydrotalcite | | | | | | | | | | |
| Base material layer resin composition | | | I | I | I | II | II | I | I | I | I | I |
| Production method of multilayered heat-recoverable article | | | I | II | II | I | I | I | I | I | I | I |
| Evaluation | | PVC wire deterioration test 1 | A | A | A | A | A | A | A | B | B | A |
| | | PVC wire deterioration test 2 | A | A | A | A | A | A | A | B | B | A |
| | | Adhesive flow test 1 | A | A | A | A | A | A | B | B | B | B |
| | | Adhesive flow test 2 | A | A | A | A | A | A | B | B | B | B |
| | | Sagging test (Moving distance mm) | 0 | 0 | 0 | 0 | 0 | — | >50 | — | — | >50 |
| | | Waterproofness test | A | A | A | A | A | B | A | A | A | A |

TABLE II

| | | |
|---|---|---|
| [A] | EVA 1 | Ethylene-vinyl acetate copolymer 1, MFR 150 g/10 min, vinyl acetate content 28% by mass |
| | EVA 2 | Ethylene-vinyl acetate copolymer 2, MFR 800 g/10 min, vinyl acetate content 28% by mass |
| | Polyamide 1 | Including a dimer acid as a dicarboxylic acid |

TABLE II-continued

| | |
|---|---|
| (deterioration inhibitor) | manufactured by Kyowa Chemical Industry Co., Ltd. |

In the multilayered heat-recoverable articles of Examples 1 to 15, as shown in Table I, the results of all of the deterioration test, the flow test, and the waterproofness test are good. Furthermore, in the multilayered heat-recoverable articles of Examples 1 to 15, in the sagging test, sagging of the adhesive is not confirmed (moving distance 0 mm). Consequently, in the multilayered heat-recoverable articles of Examples 1 to 15, excellent deterioration resistance and waterproofness are obtained, and flow of the adhesive during use is suppressed. Therefore, they are very useful as multilayered heat-recoverable articles used for PVC insulated wires. Furthermore, in the multilayered heat-recoverable article of Example 16, although the results of the deterioration test and the flow test are good, the result of the waterproofness test is not good. However, there is a high possibility that the result of the waterproofness test will improve if the shrinkage condition for the multilayered heat-recoverable article is set to a higher temperature or a longer time.

On the other hand, in the multilayered heat-recoverable articles of Comparative Examples 1 to 4, the result is not good in either one of the deterioration test and the flow test, or even in the case where the results of the deterioration test and the waterproofness test are good, a good result is not obtained in the sagging test.

REFERENCE SIGNS LIST 1, 1A multilayered heat-recoverable article
10, 10A base material layer
11, 11A adhesive layer
2 wire splice
20 wire
21 conductor wire
3 wire harness
30 wire

The invention claimed is:

1. A multilayered heat-recoverable article comprising a base material layer and an adhesive layer disposed on an inner side of the base material layer,
   wherein the adhesive layer does not flow at a temperature of 135° C. and includes [A] a thermoplastic resin and [B] a viscosity characteristics modifier composed of an organically treated layered silicate, and a deterioration inhibitor; and
   in the case where the multilayered heat-recoverable article is used to cover an insulated electrical wire which includes a conductor and a polyvinyl chloride layer provided on the outer periphery thereof, cracks do not occur in the polyvinyl chloride layer under heating conditions at 135° C. for 200 hours,
   wherein the deterioration inhibitor is at least one selected from the group consisting of activated clay and hydrotalcite.

2. The multilayered heat-recoverable article according to claim 1, wherein the viscosity characteristics modifier [B] is composed of silica, the organically treated layered silicate, and the deterioration inhibitor.

3. The multilayered heat-recoverable article according to claim 1, wherein cracks do not occur in the polyvinyl chloride layer under heating conditions at 150° C. for 200 hours.

4. The multilayered heat-recoverable article according to claim 1, wherein the thermoplastic resin [A] is at least one selected from the group consisting of an ethylene-vinyl acetate copolymer and a polyamide.

5. The multilayered heat-recoverable article according to claim 1, wherein the base material layer includes at least one selected from the group consisting of a polyethylene, a polyester, a polyamide, and a fluororesin.

6. A wire splice comprising:
   a plurality of wires, each including a conductor and a polyvinyl chloride layer provided on the outside thereof; and
   a multilayered heat-recoverable article made to adhere to a joint in which the conductors of the plurality of wires are connected to each other,
   wherein the multilayered heat-recoverable article includes a base material layer and an adhesive layer disposed on an inner side of the base material layer, in which the adhesive layer does not flow at a temperature of 135° C. and includes [A] a thermoplastic resin and [B] a viscosity characteristics modifier composed of an organically treated layered silicate and a deterioration inhibitor; and
   wherein the deterioration inhibitor is at least one selected from the group consisting of activated clay and hydrotalcite.

7. A wire harness comprising:
   a plurality of wires, each including a conductor and a polyvinyl chloride layer provided on the outside thereof; and
   a multilayered heat-recoverable article made to adhere to the plurality of wires,
   wherein the multilayered heat-recoverable article includes a base material layer and an adhesive layer disposed on an inner side of the base material layer, in which the adhesive layer does not flow at a temperature of 135° C. and includes [A] a thermoplastic resin and [B] a viscosity characteristics modifier composed of an organically treated layered silicate and a deterioration inhibitor; and
   wherein the deterioration inhibitor is at least one selected from the group consisting of activated clay and hydrotalcite.

* * * * *